US008070660B2

(12) United States Patent
Seidel

(10) Patent No.: US 8,070,660 B2
(45) Date of Patent: Dec. 6, 2011

(54) DEVICE FOR MANAGING A RETRACTABLE SHEET

(76) Inventor: Gregg A. Seidel, Manhattan Beach, CA (US)

( * ) Notice: Subject to any disclaimer, the term of this patent is extended or adjusted under 35 U.S.C. 154(b) by 1481 days.

(21) Appl. No.: 11/517,202

(22) Filed: Sep. 6, 2006

(65) Prior Publication Data

US 2007/0057439 A1 Mar. 15, 2007

(51) Int. Cl.
*F16C 13/00* (2006.01)
*E06B 9/08* (2006.01)

(52) U.S. Cl. ................ 492/15; 492/28; 492/47; 492/49; 29/895.211; 29/895.213; 29/895.23; 160/23.1

(58) Field of Classification Search .................... 492/15, 492/25, 28, 47, 49, 52, 53, 56; 29/525, 895, 29/895.2, 895.21, 895.211, 895.212, 895.213, 29/895.22, 895.3; 160/23.1, 291, 296, 313
See application file for complete search history.

(56) References Cited

U.S. PATENT DOCUMENTS 4,691,957 A * 9/1987 Ellingson ........................ 296/98
5,505,244 A * 4/1996 Thumann ...................... 160/23.1
5,860,617 A * 1/1999 Bolza-Schunemann ... 242/596.5
6,038,800 A * 3/2000 Seidel ............................. 40/517
6,644,606 B1 * 11/2003 Seidel ...................... 248/220.41
6,979,043 B2 * 12/2005 Leischner et al. .............. 296/98
7,168,195 B1 * 1/2007 Seidel ............................. 40/517
2003/0151271 A1 * 8/2003 Leischner et al. .............. 296/98

* cited by examiner

*Primary Examiner* — Sarang Afzali
(74) *Attorney, Agent, or Firm* — Sandy Lipkin

(57) ABSTRACT

A device for managing a retractable sheet that is wound on a roller by the action of a spring that may be extended by pulling on the exposed edge of the sheet wherein the device is used for printing messages thereon or for obscuring the view of nearby items. The device is easily changeable for multiple uses as the roller containing the sheet is separable from the main unit, allowing reuse of the more complex and expensive components of the device. A brake on the device prevents the spring from unwinding when the roller is removed. A damping mechanism limits the retraction speed of the sheet, which the damping mechanism being disengaged when the sheet is being pulled out. A cover is provided to obscure the main part of the unit and to prevent tampering. A unique slot configuration allows for easy, tamper-resistant installation of a header card. A pull tab is made of inexpensive components and is designed to allow for easy placement of a graphic label.

7 Claims, 5 Drawing Sheets

DEVICE FOR MANAGING A RETRACTABLE SHEET

GENERAL DESCRIPTION

This device is similar in basic function to a common roll-up window shade in that a sheet of material wound on a roller by the action of a spring may be extended by pulling on the exposed edge of the sheet. However, this device is distinguished from previous art in the following ways:

This device has multiple uses. It may be used as an advertising device, having an advertising message printed on the sheet. It may be used as an information device, having additional information about a product that a customer may access. It may be used as a curtain to hide, yet allow access to, unsightly areas such as the storage space for excess stock in a store. It may be used as a window shade. It may be used as a combination of the above.

This device is designed so that the sheet may be changed with minimum cost and effort. The sheet, along with the roller and a few associated parts, is separable from the rest of the unit leaving the more expensive components to be used again. There is a brake to prevent the spring from unwinding when the roller is removed.

This device has a damping mechanism to limit the retraction speed of the sheet. Further, it is designed so the damping mechanism is not engaged while the sheet is being pulled out.

This device is designed with a cover over the roller for the sake of appearance and to prevent tampering with the roller.

This device has a unique slot configuration for easy, yet tamper-resistant, installation of a header card.

This device has a pull tab made of inexpensive plastic extrusions which is easy to assemble. The pull tab design also allows for easy placement of a graphic label.

DETAILED DESCRIPTION

Figure 1:
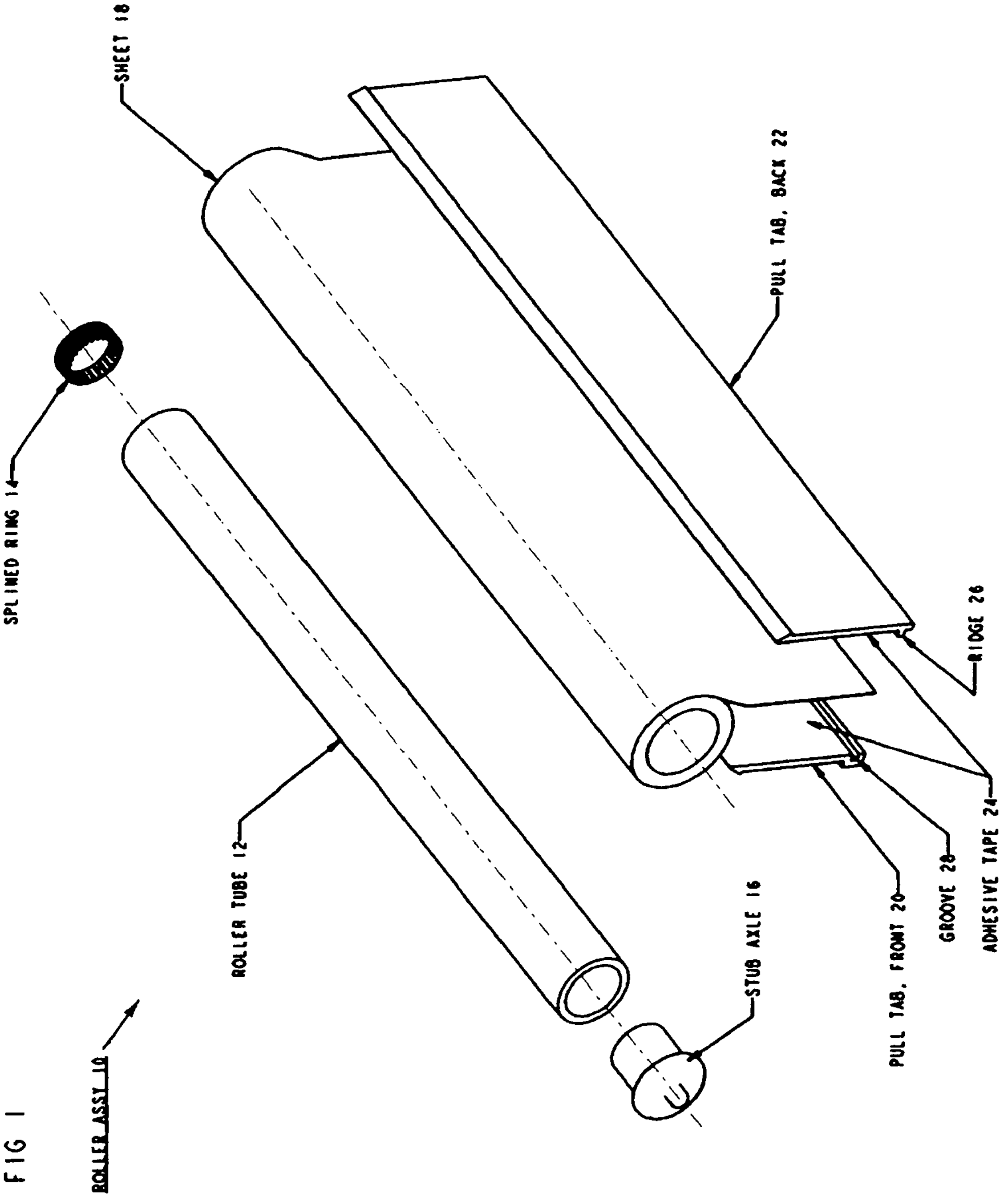
FIG. 1 is an exploded view of the roller assembly of the instant invention.

FIG. 1 is an exploded view of the roller assembly 10.

The roller tube 12 would typically be made of cardboard-type material. The outside diameter typically would be about one inch. It is expected that the length could be up to four feet, but possibly more.

Affixed at one end inside the roller tube is a splined ring 14. The splined ring has internal splines designed to engage with an externally splined member (see FIG. 3). The splined ring could be a casting, a molded part or a form sheet metal part. It could be fixed to the roller tube by press-fit, by adhesive or by crimping.

At the opposite end of the roller tube a stub axle 16 is secured by a press fit into the roller tube.

A sheet 18 is attached along one edge to the roller tube. The sheet could be made of any thin, flexible material.

A pull tab is attached to the opposite edge of the sheet. The pull tab consists of front and back extruded pieces 20 and 22.

The inner surfaces have adhesive, such as a double-sided adhesive tape 24, to assemble the pull tab pieces to the sheet. A ridge 26 on one of the pull tab pieces facilitates assembly of the sheet to the pull tab piece. The other pull tab piece has a mating groove which facilitates the assembly of the pull tab piece/sheet assembly to the pull tab piece with the groove. There is space on the outside surface of the front pull tab 30 to affix a label having instruction ("PULL") and/or an advertising message.

Figure 2:
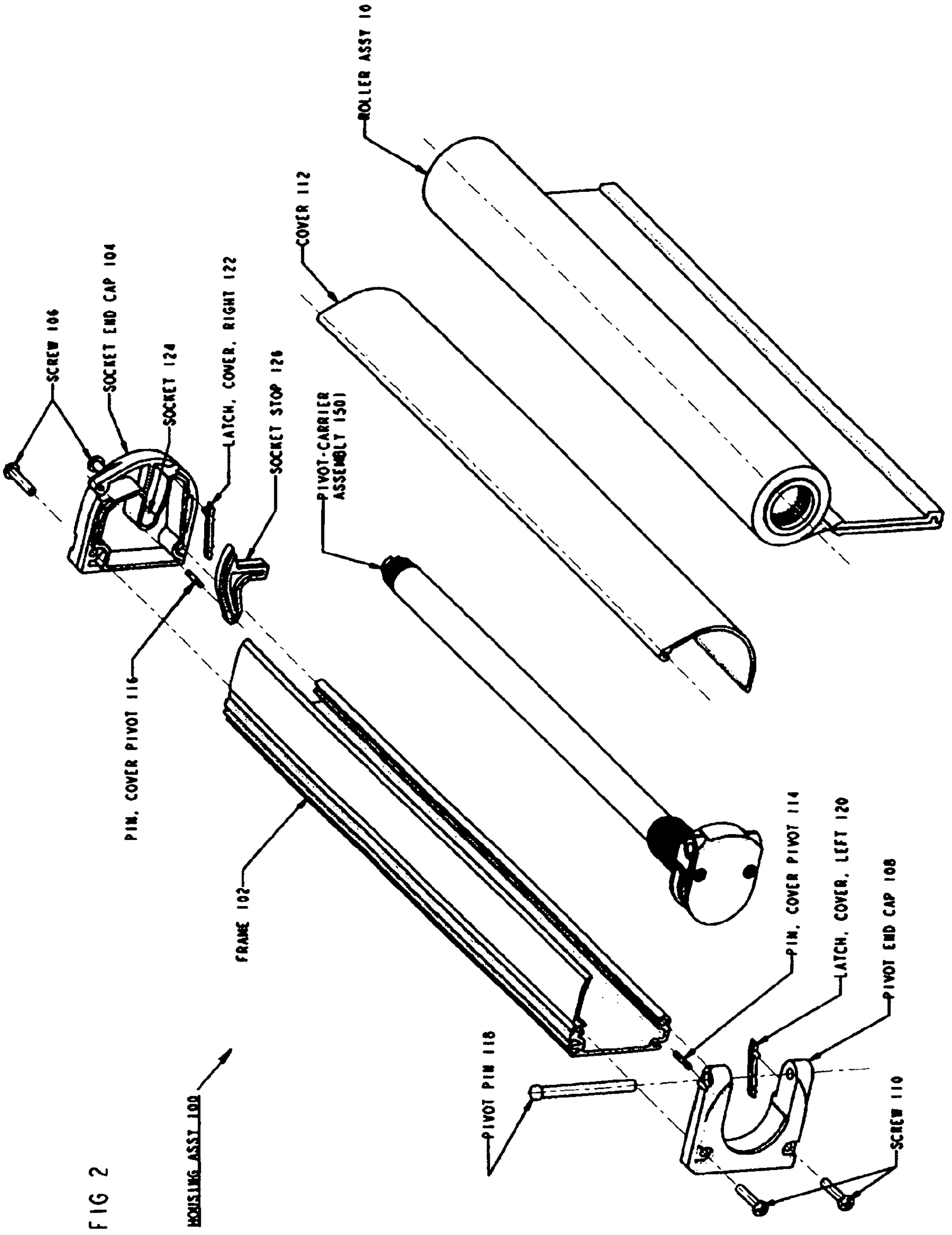
FIG. 2 is a partially exploded view of the entire device of the instant invention consisting of the housing assembly and the roller assembly.

FIG. 2 is a partially exploded view of the entire device consisting of the housing assembly 100 and the roller assembly 10.

Frame 102 is the major structural piece of the housing assembly. Preferably it is an extrusion and preferably it is made of aluminum.

Attached to one end of the frame is a socket end cap 104. It is attached by screws 106.

At the other end of the frame a pivot end cap 108 is attached by screws 110.

A cover 112 is pivotably restrained between the end caps by cover pivot pins 114 and 116.

A pivot-carrier assembly 150 is pivotably attached to the pivot end cap by pivot pin 118.

Cover latches 120 and 122 secure the cover in the closed position and must be manipulated before the cover may be opened.

The stub axle 16 of the roller assembly 10 rotates in the socket 124 of the socket end cap as the sheet is being extended or retracted. A socket stop 126 prevents the stub axle from coming out of the socket. The socket stop pivots on cover pivot pin 116. The socket stop is held in stop position by the cover while it is in its closed position. The socket stop may be moved to allow removal of the stub axle end of the roller assembly while the cover is in its open position.

Figure 3:
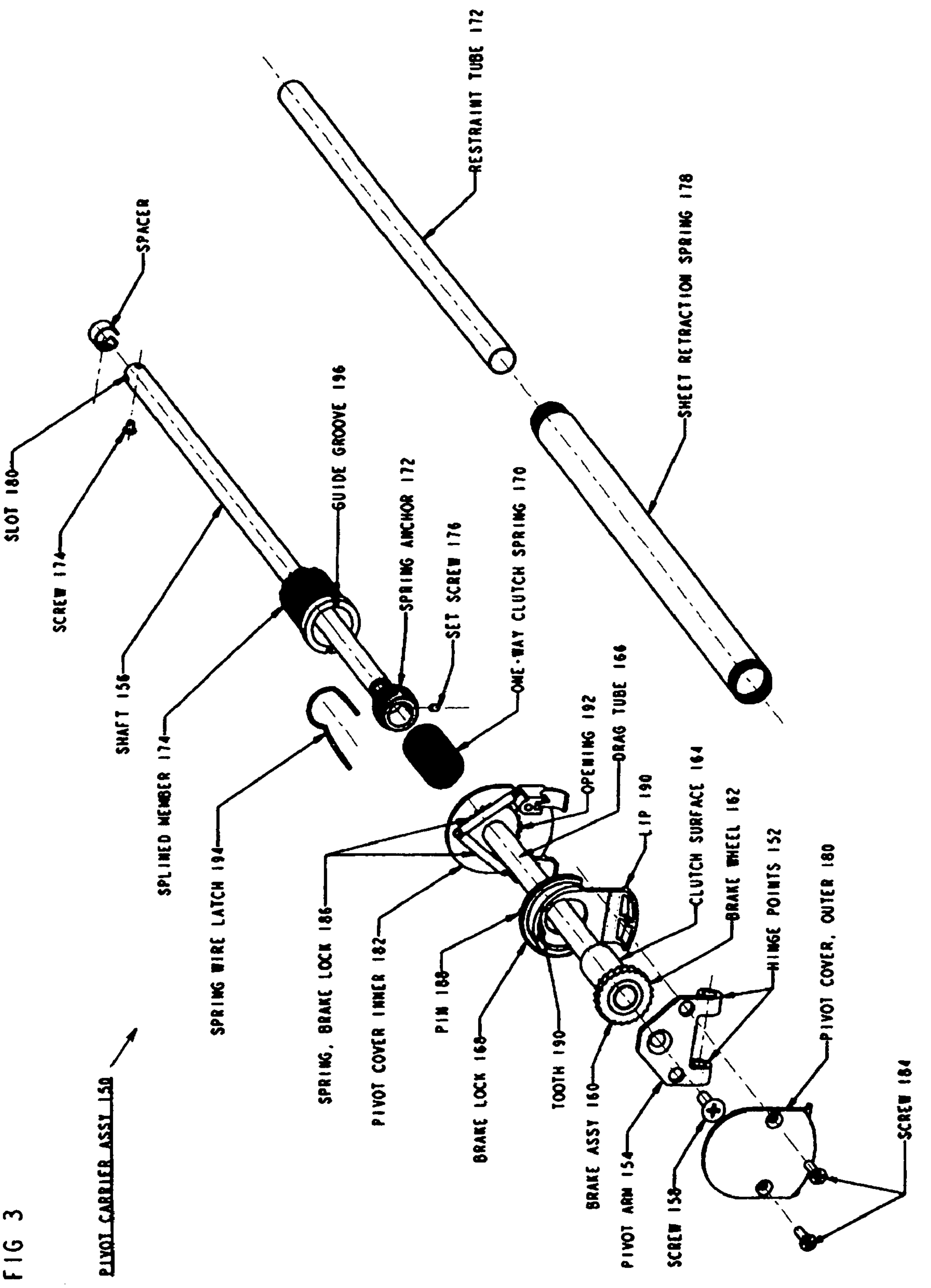
FIG. 3 is an exploded view of the pivot carrier assembly.

FIG. 3 is an exploded view of the pivot carrier assembly 150.

The pivot carrier assembly pivots about hinge points 152 which are part of pivot arm 154.

Shaft 156 is secured to the pivot arm by means of screw 158 or by welding or by staking. The shaft does not rotate relative to the pivot arm.

Brake assembly 160 fits over the shaft and may rotate relative to the shaft. The brake assembly consists of three parts: a brake wheel 162, a clutch surface 164, and a drag tube 166.

The brake wheel has teeth on its periphery. While brake lock 168 is engaged with the brake wheel the brake assembly is prevented from rotating on the shaft.

The clutch surface is the gripping surface for one-way clutch spring 170.

The one-way clutch spring is positioned over the clutch surface of the brake assembly. Rotation of one end of the one-way clutch spring in a direction corresponding to extending the sheet causes the one-way clutch spring to loosen on the clutch surface so that the clutch spring is free to rotate on the clutch surface and the drag tube does not rotate relative to the shaft. Rotation of one end of the one-way clutch spring in a direction corresponding to retraction of the sheet causes the one-way clutch spring to grip the clutch surface and causes the drag tube to rotate relative to the shaft.

The drag tube has a damping medium, such as silicone grease, in contact with its inner and/or outer surface. The damping medium is also in contact with the shaft and/or a restraint tube 172 which is affixed to the shaft by screw 174. The damping medium absorbs energy during relative movement between the drag tube and the shaft so that the retraction speed of the sheet is limited.

The shaft may be hollow with a radial hole communicating with the space between the shaft and the drag tube to facilitate the placement of the damping medium by allowing a filling machine to inject the damping medium through the hollow shaft.

One end of the one-way clutch spring is attached to a spring anchor 172. The spring anchor is fixed to the inside bore of the splined member 174 by screw or pin 176. The splined member mates with the splined ring of the roller assembly 10.

The sheet retraction spring 178 is also attached to the spring anchor. The other end of the sheet retraction spring is attached to the shaft at slot 180. The sheet retraction spring supplies torque to retract the sheet through the splined member. The brake assembly opposes this torque through the brake wheel (if it is engaged with the brake lock) or the drag tube (while the sheet is retracting).

The brake lock, brake wheel, and pivot arm are sandwiched between outer pivot cover 180 and inner pivot cover 182. The pivot covers are attached to the pivot arm by screws 184.

The brake lock is biased in the lock position (engaged with the brake wheel) by brake lock springs 186. In FIG. 3 the springs are attached to the inner pivot cover at the screw bosses and attached to the brake lock at the pin 188. The brake lock also has a tooth 190 which engages the brake wheel while in the locked position. By pushing on the brake lock (upward in FIG. 3) the user may disengage the brake lock from the brake wheel and thus allow the sheet to retract. (Note: the sheet will retract until the pull tab of the roller assembly is restrained by the housing assembly).

The brake lock may be temporarily disabled by moving the lip 190 in an axial direction so that it is restrained by the cover in its closed position. The sheet will then not stay extended when released by the user.

If the cover is opened while the brake lock is in its disabled position the brake lock will no longer be restrained by the cover and the brake lock will return to its normal non-disabled (engaged) position.

A spring wire latch 194 is attached to the splined member so that it is constrained from moving axially and so that the ends of the spring wire are biased outwardly. Guide grooves 196 prevent the spring wire ends from moving tangentially relative to the splined member.

The pivot cover has a circular opening 192 with slots. The ends of the spring wire latch will tend to move outwardly into the slots of the circular opening in the pivot cover while the splined ring of roller assembly 10 is disengaged from the splined member. Assembling the roller assembly 10 onto the pivot carrier assembly causes the splined ring to press the ends of the spring wire latch inward disengaging them from the slots and allowing the splined member to rotate relative to the inner pivot cover. This means the sheet retraction spring will not continue to unwind while the roller assembly is removed even if the brake lock is disengaged.

Figure 4:
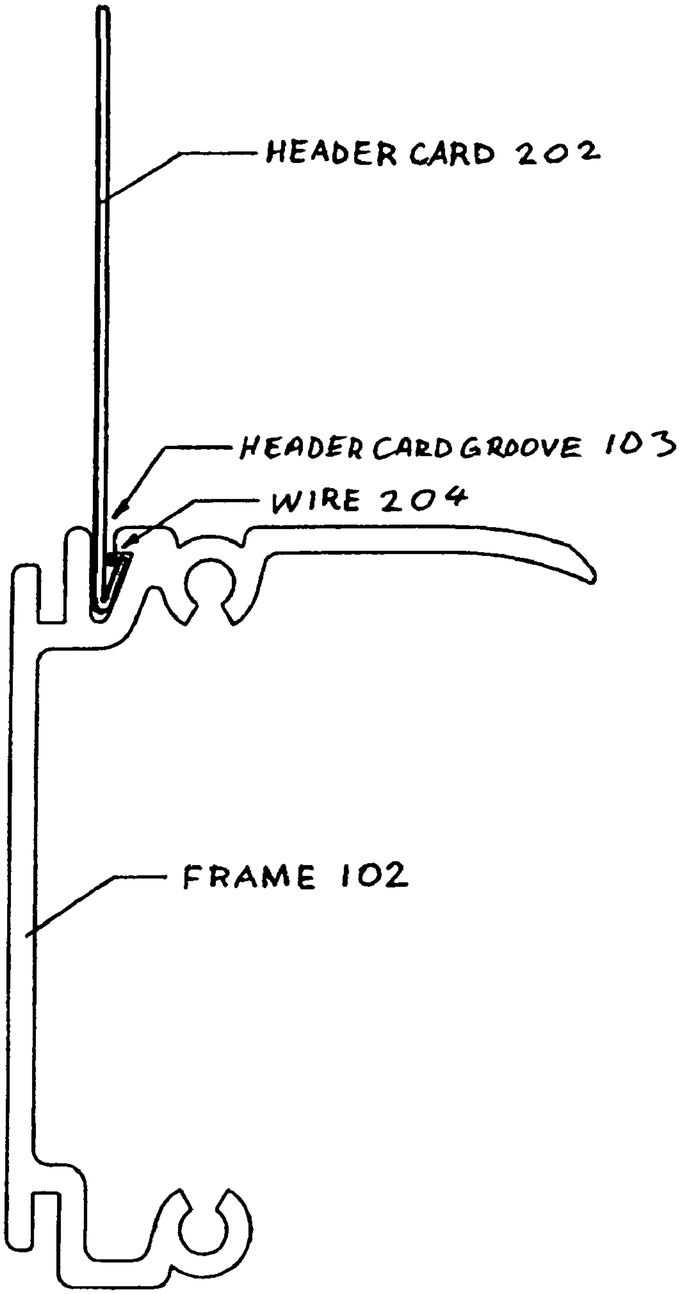
FIG. 4 is an end view of the frame illustrating a special feature for mounting a header card.

FIG. 4 is an end view of the frame 102 illustrating a special feature for mounting a header card.

Header card groove 103 is generally v-shaped but has a projection at the opening forming an interior ledge.

Header card 202 has a fold along one edge. Once the header card is pushed into the header card groove the folded part of the header card springs outward. If the header card is pulled outward the edge of the folded part of the header card will contact the interior ledge of the groove thus preventing the header card from being easily removed.

If more security is desired an additional piece, such as a wire 204, may be wedged into the groove. The ends of the wire may protrude into the interior space of the device so that they may only be accessed while the cover 112 is open. This helps prevent unauthorized removal of the wire since it would have to be pulled out by grasping an end of the wire, and the cover has its own security feature to keep it from being opened by unauthorized personnel.

Figure 5:
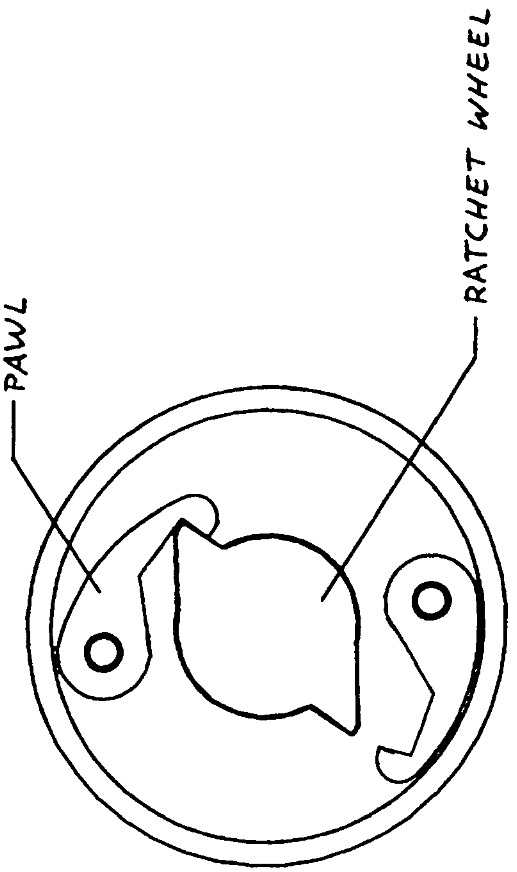
FIG. 5 shows a centrifugal clutch common to window shades.

FIG. 5 shows a centrifugal clutch common to window shades.

This type of centrifugal clutch prevents retraction of the shade (and therefore unwinding of the retraction spring) by having a pawl contact a ratchet wheel due to its own weight. Extending the shade is not inhibited because of the unidirectional nature of the ratchet wheel. In order to retract the shade it must first be rapidly pulled out a little further. This causes all the pawls to disengage from the ratchet wheel due to centrifugal effect. Letting go of the shade then allows the shade to retract because the centrifugal effect is maintained.

The centrifugal clutch described is suited to a device in which the roller assembly can be removed from the retraction spring because the release procedure described can not accidentally be done while the roller assembly is removed. The centrifugal clutch may be used as an alternative to using the brake wheel and brake lock to prevent unwinding of the sheet retraction spring (FIG. 3) when the roller assembly 10 is removed from the housing assembly (FIG. 2).

The invention claimed is:

1. A device comprising:

a roller assembly comprising:

- a roller of substantially cylindrical form having a first end and a second end;
- a substantially rectangular sheet affixed to the roller so that the sheet may be rolled up on the cylindrical surface of the roller;
- a tab attached to the sheet facilitating unrolling of the sheet by the user and preventing the roller from continuing to rotate once the sheet has been fully rolled up on the roller;
- an internally-splined member attached to the first end of the roller;

a housing assembly comprising:

- a housing, having a first end and a second end, capable of releasably constraining the roller at its first and second ends so that the roller may move only rotationally about its axis;
- a spring, mounted at the first end of the housing, capable of supplying torque to the roller relative to the housing;
- an externally-splined member which mates with the internally-splined member allowing disengagement of the roller assembly from the housing assembly, and which, while the splined members are engaged, facilitates torque transmittal between the spring and the roller;
- a brake which prevents the spring from releasing energy while the roller assembly is disengaged from the housing assembly, wherein the spring and the externally-splined member are part of an assembly which is pivotally attached to the housing allowing the roller assembly at the first end to pivot on an axis perpendicular to the axis of the roller once the second end of the roller has been released from the housing thus allowing the roller assembly to be removed from the housing assembly.

2. The device of claim 1 wherein:

the brake comprises a manually activated stop which prevents rotation of the externally-splined member relative to the housing.

3. The device of claim 2 wherein:

the housing assembly further comprises a damping mechanism capable of slowing rotation of the roller caused by the spring.

4. The device of claim 3 wherein:

the housing assembly further comprises a one-way clutch mechanism which disables the damping mechanism while the sheet is being unrolled from the roller and engages the damping mechanism while the sheet is being rolled onto the roller through action of the spring.

5. The device of claim 1 wherein the housing assembly further comprises:

a cover which is movable between a closed position, wherein the roller assembly may not be disengaged from the housing assembly, and an open position, wherein the roller assembly may be disengaged from the housing assembly.

6. The device of claim 5 wherein the housing assembly further comprises:

a latch which engages the cover while the cover is in the closed position and which must be manipulated before the cover may be opened.

7. The device of claim 1 wherein:

the brake comprises a centrifugal clutch attached to the externally-splined member allowing the externally-splined member to rotate in a direction corresponding to the unrolling of the sheet from the roller and preventing the externally-splined member from rotating in an opposite direction while the centrifugal clutch is moving at a rotational speed below a certain value and allowing the centrifugal clutch to rotate in the opposite direction while the centrifugal clutch is moving at a rotational speed above the certain value.

* * * * *